W. C. FARNUM.
MOTOR GEAR DRIVE FOR PLANERS.
APPLICATION FILED MAY 5, 1914.

1,140,334.

Patented May 18, 1915.
2 SHEETS—SHEET 1.

Witnesses,
Roswell F. Hatch.
Beatrice T. Smith.

Inventor,
William C. Farnum,
By Robt. P. Harris,
Atty.

W. C. FARNUM.
MOTOR GEAR DRIVE FOR PLANERS.
APPLICATION FILED MAY 5, 1914.

1,140,334. Patented May 18, 1915.
2 SHEETS—SHEET 2.

UNITED STATES PATENT OFFICE.

WILLIAM C. FARNUM, OF WINCHENDON, MASSACHUSETTS, ASSIGNOR OF ONE-HALF TO WILLIAM M. WHITNEY, OF WINCHENDON, MASSACHUSETTS.

MOTOR GEAR-DRIVE FOR PLANERS.

1,140,334. Specification of Letters Patent. Patented May 18, 1915.

Application filed May 5, 1914. Serial No. 836,430.

*To all whom it may concern:*

Be it known that I, WILLIAM C. FARNUM, a citizen of the United States, residing at Winchendon, county of Worcester, and State of Massachusetts, have invented an Improvement in Motor Gear-Drives for Planers, of which the following description, in connection with the accompanying drawings, is a specification, like letters on the drawings representing like parts.

The invention to be hereinafter described relates to gear driving mechanism for planers, and more particularly, though not exclusively, to such mechanism actuated directly from an electric or other motor.

As well understood by those skilled in the art, one of the most common objections incident to the transmission of power from a motor to the part to be driven, as, for instance, the cutter cylinder of a planing machine, is the excessive wear upon the bearings, particularly of the motor shaft. This wear increases rapidly in proportion to the power transmitted, and has been the cause of constant objection in such machines. With these general facts in mind, the aims and purposes of the present invention are to provide a motor gear drive for planers and the like which, while simple in construction, shall effectively overcome the objections incident to such devices and provide a counterbalancing effect to the side thrust transmitted to the motor or like shaft,—all of which will best be made clear from the following description and accompanying drawings of one form of means for carrying the invention into practical effect, it being understood, of course, that details may be varied within the true scope of the actual invention as pointed out by the claims.

Figure 1:
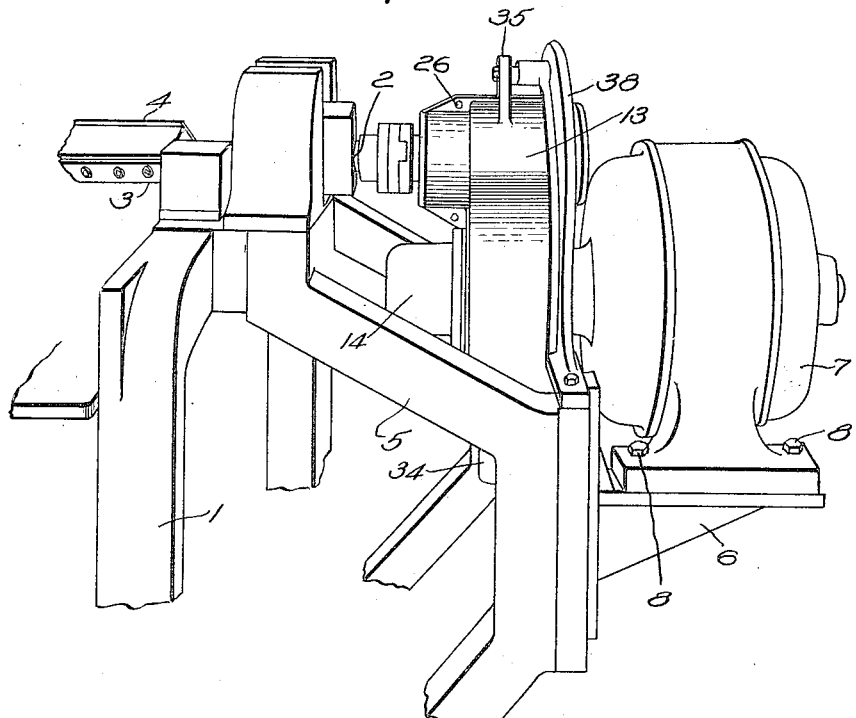
Figure 2:
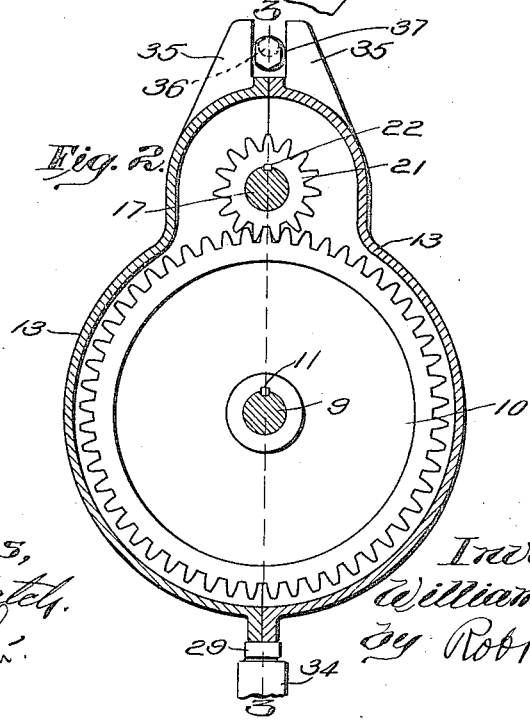
Figure 3:
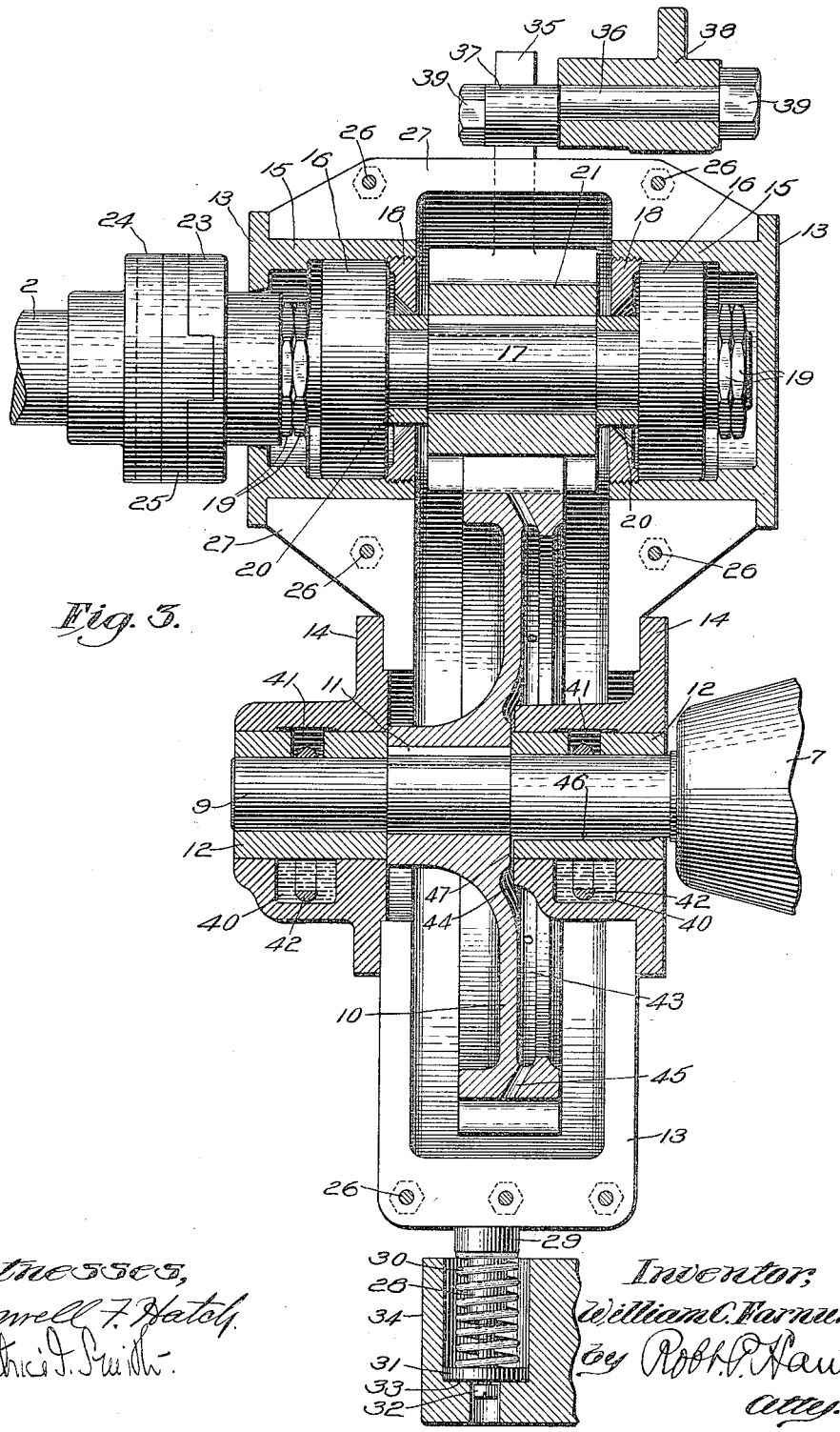

In the drawings: Figure 1 is a perspective view of sufficient parts of a planing machine having the present invention associated therewith to make clear the construction and operation thereof; Fig. 2 is a sectional detail showing the motor shaft, the floating casing, and the gearing connection between the motor shaft and spindle shaft; and Fig. 3 is an enlarged sectional view of the motor gear driving mechanism, substantially on the line 3—3, Fig. 2, the parts being shown in detail.

Referring to Fig. 1, the frame of the machine carrying the part to be driven may be of any usual or preferred construction, and, as shown, comprises the main portion 1 provided with suitable bearings for the shaft 2 which may be any shaft which is to be driven and consequently may herein be identified as the driven shaft, but as shown the said shaft 2 is typified as the shaft of a cutter cylinder 3 having knives 4. The cutter cylinder may be of any character and is here typified as of the form usually employed in wood planing machines. Extending from the main frame 1 is the auxiliary frame 5 having suitable provisions for supporting the motor from which the driven shafts or cutter cylinder is to be driven, as will presently appear. This auxiliary frame may obviously be changed to suit conditions of use, but as shown it is provided as a support for both the motor and motor gear driving mechanism.

As a convenient means for sustaining the motor 7 from the frame, a bracket 6 is employed to which the motor 7 may be secured by appropriate means, such as the bolts 8. In the present form of the invention, the motor is provided as an electric type, and such form of motor has been found in practice to be well suited for driving the cutter cylinder of a planing machine through the means presently to be described.

Extending from the motor 7 is the motor shaft 9, said shaft having the usual bearings within the motor casing. Secured to rotate with the motor shaft 9 is the gear 10 which may be conveniently splined to the shaft as shown at 11, Figs. 2 and 3.

Loosely mounted upon the motor shaft 9, preferably at each side of the gear 10, is a bushing 12 which affords a convenient means for associating with the motor shaft 9 the floating casing 13, Fig. 2. The floating casing 13 has the bearing portions 14, Fig. 3, which surround the bushings 12, said bearing portions 14 being preferably, though not necessarily, made separate from the remainder of the casing 13, and secured to the casing 13 in any suitable manner. Obviously, the bearing portions 14 might be otherwise formed, or instead of using two such bearing portions, only one might serve to associate the floating casing 13 with the motor shaft 9.

The floating casing 13, as will be noted from Figs. 2 and 3, rises upon the motor shaft 9, and is provided with portions 15 for the accommodation of suitable bearings 16 for the shaft 17, as will be evident from Fig. 3. The bearings 16 may be of any appropriate type suitable to properly support the shaft 17, and in practice it is found convenient and as a medium for reducing friction to employ suitable ball or other anti-friction bearings. The details of this, however, are not in the essence of the present invention, and such bearings may be of any desired type. In the form of the invention shown, these bearings are held in the upper portion of the floating casing by screw rings 18, and suitable nuts 19 serve to maintain the shaft 17 in its proper bearing relation with the bearing 13.

Mounted upon the shaft 17 is a gear 21 adapted to mesh with the gear 10 on the motor shaft 9, as will be evident from Figs. 2 and 3. The gear 21 may be appropriately connected to the shaft 17, as by a key or spline 22, and properly positioned thereon by means of appropriate sleeves 20, Fig. 3, interposed between the side faces of the gear and bearings 16. These detailed features of construction are not essentials of the present invention, and may be varied within the skill of the ordinary mechanic. In use it is found convenient to form the gear 21 of fiber and steel combined, thereby producing a noiseless and more durable construction, but obviously this is not a material feature of the present invention.

The shaft 17 extends at one end beyond the floating casing 13, as indicated in Figs 1 and 3, and is provided with one member 23 of a clutch, the other member 24 thereof being appropriately secured to the cutter shaft 2. This clutch is preferably of the Oldham type, well known by those skilled in the art. Briefly, it comprises the grooved disks 23 and 24 and the connecting portion 25, the construction being such that the cutter shaft 2 may be driven directly from the shaft 17, even though the two shafts be somewhat out of alinement.

From the construction thus far described, it will be apparent that the floating casing 13, while mounted upon the motor shaft 9 through the interposition of the bushings 12, provides at one portion thereof, the upper portion as indicated in Figs. 1 and 3, suitable bearings for the shaft 17, which, for convenience of identification, will be hereafter referred-to as the spindle shaft. This floating casing may be variously constructed, but in the illustrated form of the invention, it comprises a surrounding or inclosing case for the gears 10 and 21, while at the same time providing the bearings for the spindle shaft 17. In order that the casing may be readily applied and removed, it may be formed of two parts, as indicated in Figs. 2 and 3, that is, the casing may be formed of two halves, and these halves secured together by appropriate means such as the bolts 26 passing through the flanged portions 27, as will be readily understood.

It is desirable that the weight of the floating casing 13 and its associated parts carried by it, shall not rest upon the motor shaft 9, and to this end the floating casing 13 may be suitably counterbalanced. Various forms of counterbalancing means may be employed, as will be obvious, but a convenient form of such means is indicated in Fig. 3, wherein the lower portion of the casing 13 has extending downward therefrom a lug 28 having a shoulder 29 against which one end of a spring 30 is seated, the other end of the spring 30 resting on a washer 31 properly secured to the projection 28 as by an adjusting screw 32. The washer or disk 31 rests on a suitable support, such support herein being represented as the bottom wall of a socket 33 formed in a stationary part 34, the construction being such that by proper manipulation of the adjusting screw 32 the spring 30 may be properly tensioned to counterbalance the weight of the floating casing 13, and the parts supported by it.

The floating casing 13 has projecting from its upper portion, the lugs 35 between which extends the pin 36 having an eccentric 37. The pin 36 may be appropriately supported as by the frame 38 extending from a stationary part of the machine or otherwise, and the pin 36 may be appropriately passed through an opening in said frame 38, as indicated in Fig. 3, and held in position by appropriate nuts 39. By loosening the nuts 39 and turning the eccentric 37, it will be evident that the position of the floating casing 13 may be adjusted about the axis of the motor shaft 9, the construction being such that should the spindle shaft 17 and cutter cylinder shaft 2 be not in alinement, the eccentric 37 or other suitable adjusting means may be appropriately manipulated to bring such shafts into the desired alinement or approximately so.

From the construction described, it will be noted that the floating casing 13 is mounted so that if free to turn it would revolve about the axis of the motor shaft 9; and it will also be noted that said casing serves to support the bearings of the spindle shaft which transmits power from the motor shaft direct to the driven shaft or cutter cylinder shaft through the gears 10 and 21, the lugs 35 and pin 36 serving as means to prevent rotary movement of the floating casing. Thus, the side thrust upon the motor shaft 9 due to power applied through the gear 10 to the gear 21, is divided between the shaft 9 and the pin 36, thereby reducing the side thrust and wearing objection heretofore present. Obviously, the counterbalancing effect produced by the described construction will depend upon the leverage between the axis of the shaft 9, the pitch line between the gears 10 and 21, and the axis of the pin or stop 36. The bearing pressure or side thrust upon the motor shaft being thus relieved or materially reduced, the friction incident thereto is likewise lessened, and the wearing of parts decreased.

The casing 13 and its mounting in relation to the motor shaft may be varied, of course, said casing acting as a spindle shaft supporting member floating upon or about the motor shaft and limited in such floating movement by the pin or stop 36.

In order that the motor shaft 9 may be properly lubricated, the bearing portions 14 are provided with an oil chamber 40, Fig. 3, and the bushings 12 are cut away as at 41 to afford a proper seat for a loose lubricating ring 42, the construction being such that as the shaft 9 rotates the ring 42 will travel through the lubricator liquid and carry portions thereof to the surface of the motor shaft.

In order that the teeth of the intermeshing gears shall be properly lubricated, the present invention contemplates forming the gear 10 with the radial duct or oil passage 43, Fig. 3, extending from a recessed hub portion 44 toward the periphery of the gear, where it communicates with the teeth by means of the passage 45. Only a small portion of lubricant will be desired to be transmitted to the teeth of the gear 10, and to this end the bushing 12 has a groove 46 extending toward the hub of the gear 10 where it terminates in a radial passageway 47 leading into the recessed hub portion 44, the construction being such that the lubricant will be taken from the surface of the motor shaft 9 and find its way to the recessed hub portion of the gear 10, whereupon under centrifugal action, the lubricant will be transmitted to the teeth of the gear.

What is claimed is:—

1. In a motor gear driving mechanism, the combination of a motor shaft, a motor shaft gear mounted to rotate therewith, a floating casing associated with said shaft, a spindle shaft mounted on said casing at one side of the motor shaft and carrying a gear meshing with said motor shaft gear, a driven shaft, means for connecting the spindle shaft and driven shaft end to end, and means to prevent rotation of the casing about the motor shaft.

2. In a mechanism of the character described, the combination of a motor shaft, a motor shaft gear mounted to rotate therewith, a spindle shaft, a gear fixed thereon and operatively connected to the motor shaft gear, and rigid means mounted to float upon the motor shaft and carrying the spindle shaft to transmit to said motor shaft a lateral thrust in opposition to the lateral thrust on said shaft produced by power transmitted through said motor shaft gear.

3. In a driving mechanism for the cutter cylinder of a planing machine, the combination of a motor shaft, a motor shaft gear mounted thereon, a spindle shaft having a gear fixed thereon and operatively engaged with the motor shaft gear, a member loosely mounted on the motor shaft and projecting to one side thereof, said member carrying the spindle shaft and its gear, and means for locking said member from rotative movement about the axis of the motor shaft to cause said member to partly counterbalance the lateral thrust on the motor shaft due to power transmitted through said motor shaft gear.

4. In a motor driving mechanism for the cutter cylinders of planing machines, the combination of the motor shaft having a gear to rotate therewith, a spindle shaft carrying a gear meshing with said first-named gear, and means in addition to said spindle shaft and its gear for transmitting part of the lateral thrust of the motor shaft gear back to the motor shaft in a direction opposite to the lateral thrust on said shaft due to its power transmission.

5. In a motor driving mechanism for the cutter cylinders of planing machines, the combination of the motor shaft having a gear fast thereon, a spindle shaft having a gear meshing with the first-named gear, a member pivotally floating on the motor shaft and carrying said spindle shaft and its gear, and means at a greater radial distance from the motor shaft than the spindle shaft to prevent rotative movement of said member about the motor shaft.

6. A motor gear drive, comprising a motor shaft, a spindle shaft, gearing connections between said shafts, a casing mounted upon the motor shaft and carrying said spindle shaft, a driven shaft, a clutch for connecting the driven shaft and spindle shaft end to end, means engaging the casing to cause the side thrust upon the motor shaft due to its transmission of power to be counteracted by a side thrust of the casing on said shaft in an opposite direction, and means for counterbalancing the weight of said casing.

7. A motor gear drive for planers, comprising a motor shaft, having a gear secured thereto, a casing loosely mounted on said motor shaft, and having bearings disposed at one side of the motor shaft, a spindle shaft supported by the said bearings and having a gear operatively connected to the first-named gear, a projection extending from the casing, and a stop engaging said projection at a point a greater distance from the motor shaft than the spindle shaft to cause the casing to exert a side thrust upon the motor shaft in a direction opposite to the side thrust on said shaft due to power transmission through said gears.

8. A motor gear drive for planers, comprising a motor shaft having a gear secured thereto, a casing loosely mounted on said motor shaft and having bearings disposed at one side of the motor shaft, a spindle shaft supported by the said bearings and having a gear operatively connected to the first-named gear, means for counterbalancing the weight of said casing, a projection extending from the casing, and a stop engaging said projection at a point a greater distance from the motor shaft than the spindle shaft to cause the casing to exert a side thrust upon the motor shaft in a direction opposite to the side thrust on said shaft due to power transmission through said gears.

9. In a motor gear drive of the character described, the combination of a motor shaft, a spindle shaft at one side of the motor shaft, a driven shaft, a clutch for connecting the driven shaft and spindle shaft end to end, a spindle shaft carrying member loosely mounted upon the motor shaft and having bearings in which the spindle shaft is mounted, gearing connecting the motor shaft and spindle shaft, and means for adjusting and holding said spindle shaft carrying member in position about the axis of the motor shaft to aline the driven shaft and spindle shaft.

10. In a motor gear drive of the character described, the combination of a motor shaft, a spindle shaft at one side of the motor shaft, a driven shaft, a clutch for connecting the driven shaft and spindle shaft end to end, a spindle shaft carrying member loosely mounted upon the motor shaft and having bearings in which the spindle shaft is mounted, gearing connecting the motor shaft and spindle shaft, means for adjusting and holding said spindle shaft carrying member in position about the axis of the motor shaft to aline the driven shaft and spindle shaft, and yielding means for counterbalancing the spindle shaft carrying member to relieve the motor shaft.

11. In a motor gear drive of the character described, the combination of a motor shaft, a spindle shaft, power transmission gearing between said shafts, a casing 13 mounted to move around an axis coincident with the axis of the motor shaft, said casing supporting the spindle shaft, and a locking device engaging the casing beyond the spindle shaft.

12. In a motor gear drive of the character described, the combination of a motor shaft, a spindle shaft, power transmission gearing between said shafts, a casing 13 mounted to move around an axis coincident with the axis of the motor shaft, said casing supporting the spindle shaft, a locking device engaging the casing beyond the spindle shaft, and means to support the weight of the casing to relieve the motor shaft.

In testimony whereof, I have signed my name to this specification, in the presence of two subscribing witnesses.

WILLIAM C. FARNUM.

Witnesses:
HOWARD T. ELLIOTT,
ARTHUR S. WASHBURN.

Copies of this patent may be obtained for five cents each, by addressing the "Commissioner of Patents, Washington, D. C."